(12) United States Patent
Nasu

(10) Patent No.: US 11,837,800 B2
(45) Date of Patent: Dec. 5, 2023

(54) ANTENNA UNIT AND ELECTRONIC DEVICE

(71) Applicant: Murata Manufacturing Co., Ltd., Nagaokakyo (JP)

(72) Inventor: Takafumi Nasu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 364 days.

(21) Appl. No.: 17/356,570

(22) Filed: Jun. 24, 2021

(65) Prior Publication Data

US 2021/0320412 A1 Oct. 14, 2021

Related U.S. Application Data

(63) Continuation of application No. PCT/JP2020/030063, filed on Aug. 5, 2020.

(30) Foreign Application Priority Data

Aug. 27, 2019 (JP) .................................. 2019-154827
Sep. 9, 2019 (JP) .................................. 2019-163567

(51) Int. Cl.
*H01Q 5/371* (2015.01)
*H01Q 5/378* (2015.01)
(Continued)

(52) U.S. Cl.
CPC ............. *H01Q 5/371* (2015.01); *H01Q 1/243* (2013.01); *H01Q 5/378* (2015.01); *H01Q 7/00* (2013.01); *H04W 72/044* (2013.01)

(58) Field of Classification Search
None
See application file for complete search history.

(56) References Cited

U.S. PATENT DOCUMENTS 11,646,495 B2 * 5/2023 Ishizuka ................ H01Q 21/30
343/700 MS
2008/0231526 A1 * 9/2008 Sato ........................ H01Q 7/00
343/722

(Continued)

FOREIGN PATENT DOCUMENTS

| JP | 2012-109875 A | 6/2012 |
| WO | 2012/153690 A1 | 11/2012 |
| WO | 2018/101284 A1 | 6/2018 |

OTHER PUBLICATIONS

Official Communication issued in International Patent Application No. PCT/JP2020/030063, dated Oct. 20, 2020.

*Primary Examiner* — Jany Richardson
(74) *Attorney, Agent, or Firm* — Keating & Bennett, LLP

(57) ABSTRACT

An antenna unit includes a coupling element including first and second coils, a feeding radiating element, and a parasitic radiating element. A series circuit including the first coil and a feeder circuit is connected to the feeding radiating element, and the parasitic radiating element is connected to the second coil. A distance between open ends of the parasitic radiating element and a short portion of the feeding radiating element is shorter than a distance between open ends of the parasitic radiating element and a long portion the feeding radiating element. The antenna unit is an antenna for a first frequency band with fundamental wave resonance of the long portion and fundamental wave resonance of the parasitic radiating element, and a second frequency band with higher-order resonance of the parasitic radiating element and resonance of the short portion, the second frequency band being higher than the first frequency band.

20 Claims, 16 Drawing Sheets

(51) Int. Cl.
*H01Q 1/24* (2006.01)
*H01Q 7/00* (2006.01)
*H04W 72/044* (2023.01)

(56) References Cited

U.S. PATENT DOCUMENTS

| | | |
|---|---|---|
| 2012/0127055 A1 | 5/2012 | Yamagajo |
| 2014/0049440 A1 | 2/2014 | Ueki et al. |
| 2014/0306857 A1 | 10/2014 | Bevelacqua et al. |
| 2019/0214727 A1* | 7/2019 | Mikawa .................. H01Q 1/24 |
| 2020/0373083 A1* | 11/2020 | Nasu ....................... H01Q 9/42 |
| 2021/0320418 A1* | 10/2021 | Tachibana ............ H01Q 9/0414 |

* cited by examiner

FIG. 6
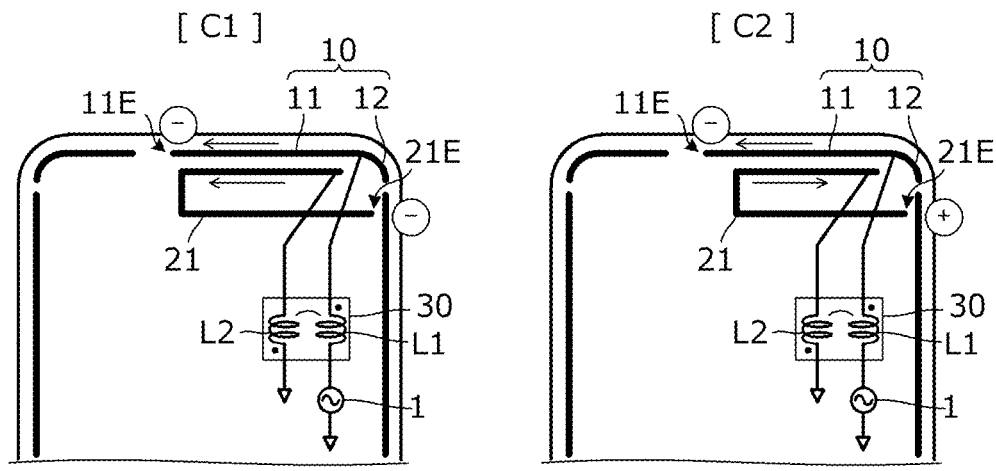
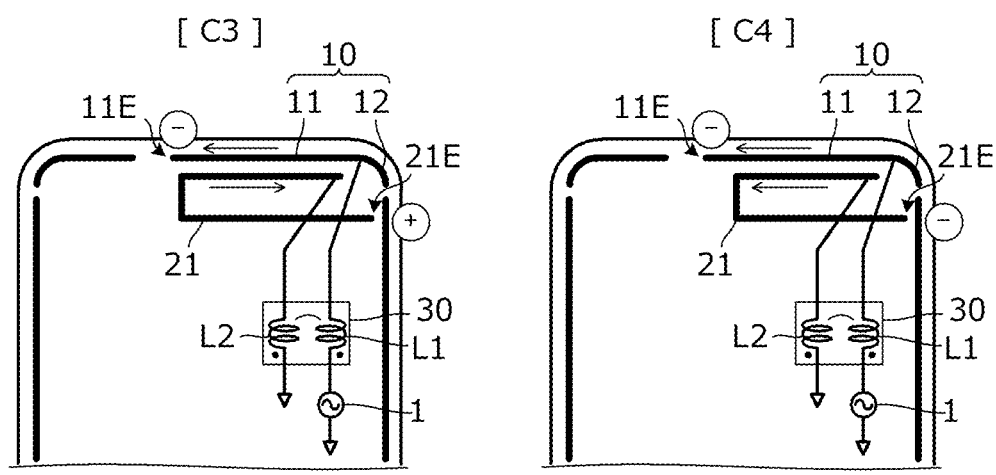

FIG. 7
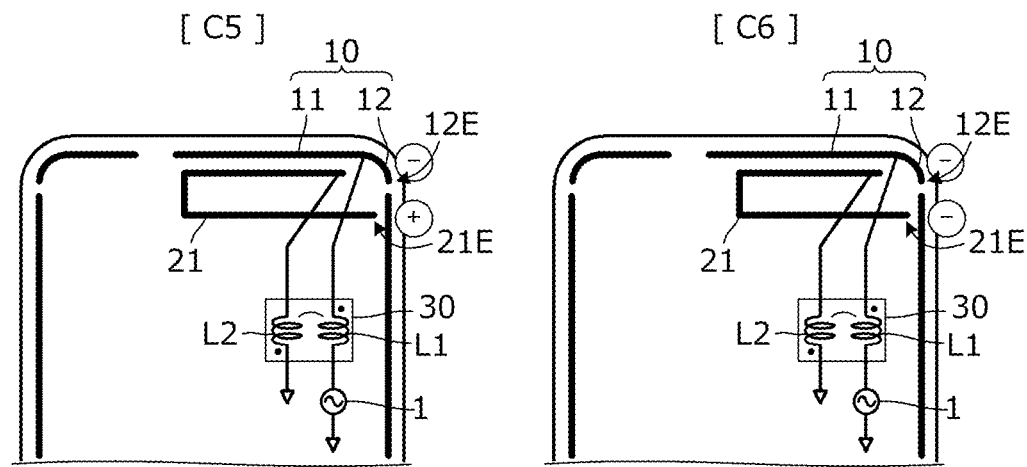
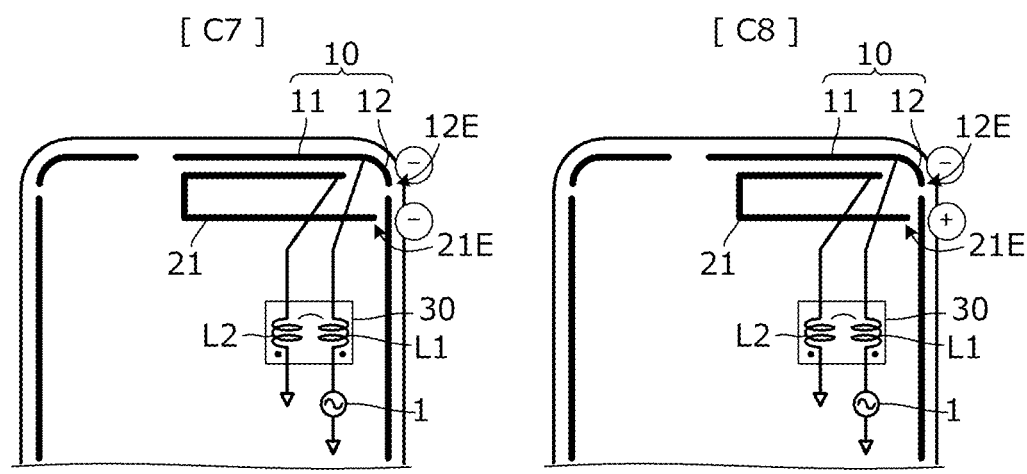

ANTENNA UNIT AND ELECTRONIC DEVICE

CROSS REFERENCE TO RELATED APPLICATIONS

This application claims the benefit of priority to Japanese Patent Application No. 2019-163567 filed on Sep. 9, 2019 and Japanese Patent Application No. 2019-154827 filed on Aug. 27, 2019, and is a Continuation Application of PCT Application No. PCT/JP2020/030063 filed on Aug. 5, 2020. The entire contents of each application are hereby incorporated herein by reference.

BACKGROUND OF THE INVENTION

1. Field of the Invention

The present invention relates to an antenna unit that is connected to a high frequency circuit and an electronic device including the antenna unit.

2. Description of the Related Art

In an antenna unit configured to use, as a radiating element, a portion of the frame of the housing of an electronic device, to broaden a corresponding frequency band of the antenna unit or to support a plurality of frequency bands, U.S. Patent Application Publication No. 2014/0306857 describes a configuration that uses a feeding point-to-first open end portion of a frame section and a feeding point-to-second open end portion of the frame section as antennas for different frequency bands. Here, by making the length from the feeding point to the first open end longer than the length from the feeding point to the second open end, the feeding point-to-first open end portion is provided as a low band antenna and the feeding point-to-second open end portion is provided as a high band antenna.

In the above-described antenna unit that uses the portions from the feeding point to the two open ends as the radiating element, the length from the feeding point to the first open end and the length from the feeding point to the second open end can be determined independent of each other, but a frequency band from a low band to a high band cannot be covered by the above-mentioned single radiating element in some cases. For example, it is difficult to cover Long Term Evolution (LTE) having a low band of from 0.7 GHz to 0.96 GHz and a high band of from 1.71 GHz to 2.69 GHz.

Accordingly, to broaden the band, it is required to provide a circuit configured to selectively connect an element having a given reactance on a connection path between the feeding point of the radiating element and a feeder circuit. However, a switch is required for such reactive element selection. Further, carrier aggregation is not supported by band broadening with switching control, and thus high-speed communication using carrier aggregation cannot be achieved, which is a problem.

SUMMARY OF THE INVENTION

Preferred embodiments of the present invention provide antenna units that are each able to broaden a band without depending on the switching of a switch, and electronic devices that each include such an antenna unit.

An antenna unit according to a preferred embodiment of the present invention includes a coupling element that includes a first coil and a second coil coupled to each other by electromagnetic-field coupling, a feeding radiating element, and a parasitic radiating element. The first coil and a feeder circuit are connected to the feeding radiating element in series. The parasitic radiating element is connected to the second coil. The feeding radiating element is branched into a long portion and a short portion. A distance between an open end of the parasitic radiating element and an open end of the short portion is shorter than a distance between the open end of the parasitic radiating element and an open end of the long portion of the feeding radiating element. The antenna unit is provided as an antenna for a first frequency band with fundamental wave resonance of the long portion of the feeding radiating element and fundamental wave resonance of the parasitic radiating element and is provided as an antenna for a second frequency band with higher-order resonance of the parasitic radiating element and resonance of the short portion of the feeding radiating element, the second frequency band being higher than the first frequency band.

With the features and configuration described above, an antenna unit is able to be provided that broadens the first frequency band and the second frequency band.

An electronic device according to a preferred embodiment of the present invention includes an antenna unit according to a preferred embodiment of the present invention, a feeder circuit, and a housing that accommodates the feeder circuit. A portion or an entirety of the feeding radiating element corresponds to a portion of the housing.

With the features and configuration described above, a conductive member or conductor pattern dedicated for a radiating element is unnecessary, and the electronic device is thus able to be reduced in size. Further, even when the electronic device has a metal housing, the antenna unit is not shielded by the metal housing.

According to preferred embodiments of present invention, antenna units each having wide band characteristics without depending on the switching of a switch, and electronic devices each including such an antenna units, are provided.

The above and other elements, features, steps, characteristics, and advantages of the present invention will become more apparent from the following detailed description of the preferred embodiments with reference to the attached drawings.

BRIEF DESCRIPTION OF THE DRAWINGS

FIG. 6 is a diagram illustrating four combinations of the coupling polarity of the coupling element 30, the resonant mode of a feeding radiating element, and the resonant mode of a parasitic radiating element in terms of a low band.

FIG. 7 is a diagram illustrating four combinations of the coupling polarity of the coupling element 30, the resonant mode of the feeding radiating element, and the resonant mode of the parasitic radiating element in terms of a high band.

DETAILED DESCRIPTION OF THE PREFERRED EMBODIMENTS

First Preferred Embodiment

Figure 1:
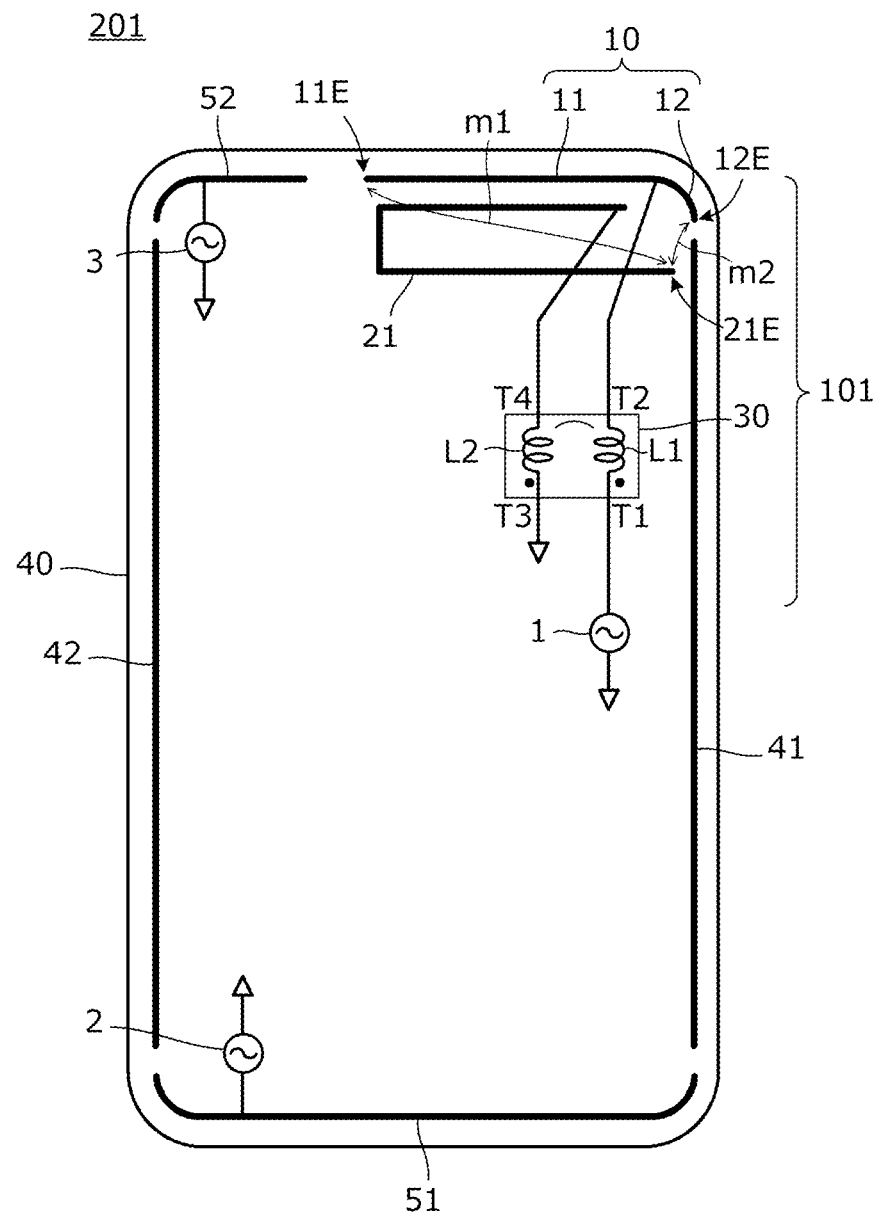
FIG. 1 is a plan view illustrating an antenna unit 101 according to a first preferred embodiment of the present invention and an electronic device 201 including the antenna unit 101.

FIG. 1 is a plan view illustrating an antenna unit 101 according to a first preferred embodiment of the present invention and an electronic device 201 including the antenna unit 101.

The antenna unit 101 includes a coupling element 30 including a first coil L1 and a second coil L2, a feeding radiating element 10, and a parasitic radiating element 21. The antenna unit 101 is provided in a housing 40 of the electronic device 201.

The feeding radiating element 10 corresponds to a portion of the metal frame of the housing 40. The parasitic radiating element 21 includes a conductor pattern provided on the surface of a resin molded structure by laser-direct-structuring (LDS), for example. The coupling element 30 is mounted on a circuit board. Further, a feeder circuit 1 is provided on the circuit board.

The first coil L1 of the coupling element 30 and the feeding radiating element 10 are connected to the feeder circuit 1. The series circuits including the first coil L1 and the feeder circuit 1 are connected to the feeding radiating element 10. In this example, the first coil L1 is connected between the feeder circuit 1 and the feeding radiating element 10.

The parasitic radiating element 21 is connected to the second coil L2 of the coupling element 30. In this example, the second coil L2 is connected between the parasitic radiating element and the ground. The feeding radiating element 10 and the parasitic radiating element 21 are connected to the coupling element 30 by subtractive polarity connection. The dots in the drawing indicate the polarity of the couplings. The end portion opposite to the end portion connected to the second coil L2 is an open end 21E of the parasitic radiating element 21.

Figure 4:
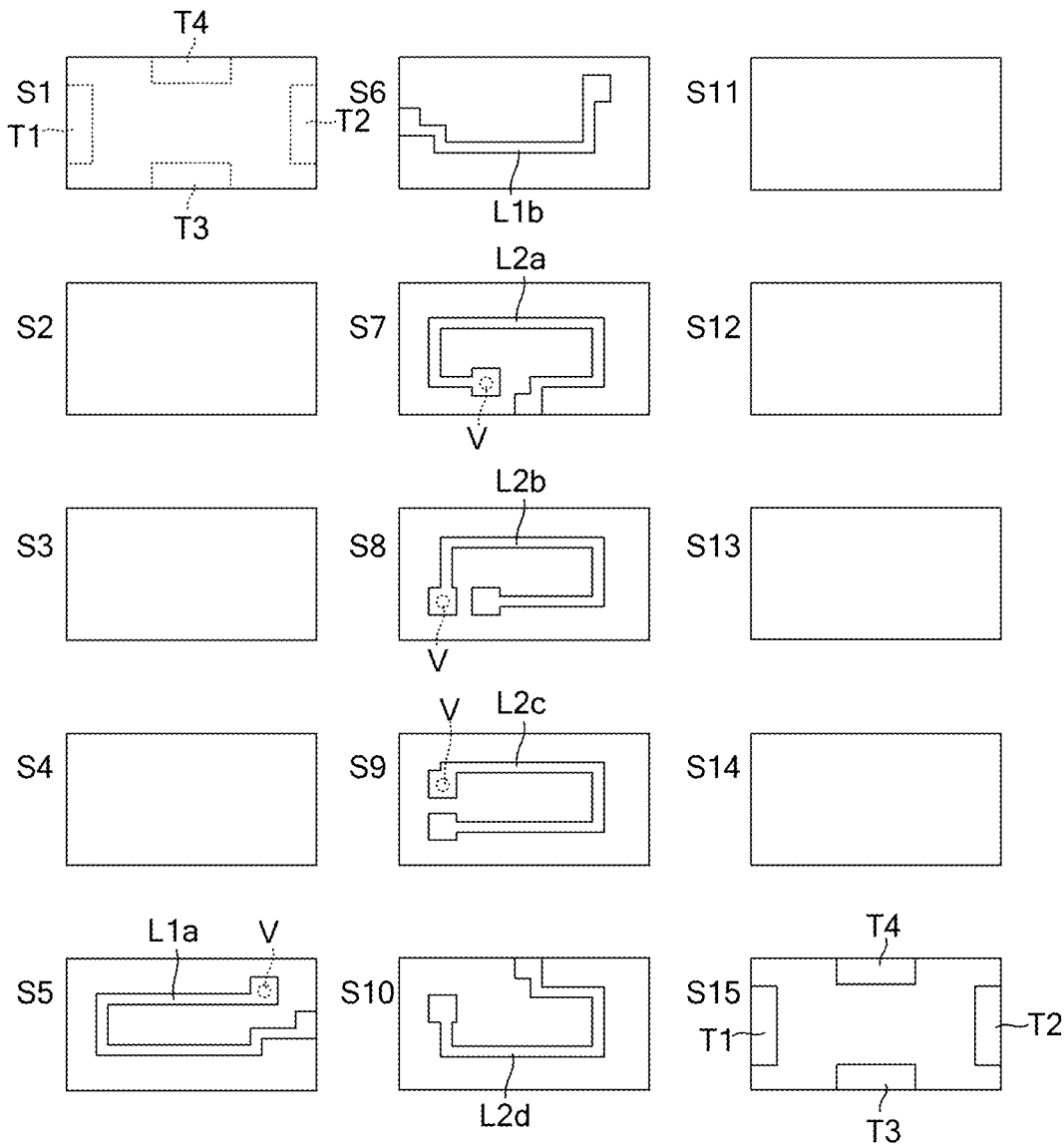
FIG. 4 is an exploded plan view illustrating conductor patterns provided on the respective layers of the coupling element 30.

Here, the polarity of coupling is described. A coupling polarity is defined as "subtractive polarity", the coupling polarity providing a relationship in which the direction of a magnetic field that is generated at the first coil L1 with a current flowing through the first coil L1 from a terminal T1 to a terminal T2 and the direction of a magnetic field that is generated at the second coil L2 with a current flowing through the second coil L2 from a terminal T3 to a terminal T4 are the same (are both the upward direction with respect to the mounting surface) as illustrated in FIG. 4, that is, a relationship in which the direction of a magnetic field that is generated at the first coil L1 when a current flows from the first coil L1 to the feeding radiating element 10 and the direction of a magnetic field that is generated at the second coil L2 when a current flows from the second coil L2 to the parasitic radiating element 21 are the same. In contrast, a coupling polarity is defined as "additive polarity", the coupling polarity providing a relationship in which the direction of a magnetic field that is generated at the first coil L1 when a current flows from the first coil L1 to the feeding radiating element 10 and the direction of a magnetic field that is generated at the second coil L2 when a current flows from the second coil L2 to the parasitic radiating element 21 are opposite to each other.

The feeding radiating element 10 includes a long portion 11 from a feeding point (the connection point to the first coil L1 in this example) to one open end and a short portion 12 from the feeding point to the other open end. That is, the feeding radiating element 10 is branched into the long portion (main branch portion) 11 and the short portion (auxiliary branch portion) 12. The feeding radiating element 10 includes an open end 11E of the long portion 11 and an open end 12E of the short portion 12.

A distance m2 between the open end 21E of the parasitic radiating element 21 and the open end 12E of the short portion 12 is shorter than a distance m1 between the open end 21E of the parasitic radiating element 21 and the open end 11E of the long portion 11 of the feeding radiating element 10. According to the structure described above, the open end 21E of the parasitic radiating element 21 is away from the open end of the long portion 11 of the feeding radiating element 10 so that when the potentials of the two open ends are the same or substantially the same potential, the electric fields are effectively added in low and high bands. This is further described herein.

The antenna unit 101 is provided as an antenna for a low band with the fundamental wave resonance of the feeding radiating element 10 and the fundamental wave resonance of the parasitic radiating element 21. Further, the antenna unit 101 is provided as an antenna for a high band with the higher-order resonance of the parasitic radiating element 21 and the resonance of the short portion 12 of the feeding radiating element 10. The low band is an example of "first frequency band". The high band is an example of "second frequency band".

Figure 20:
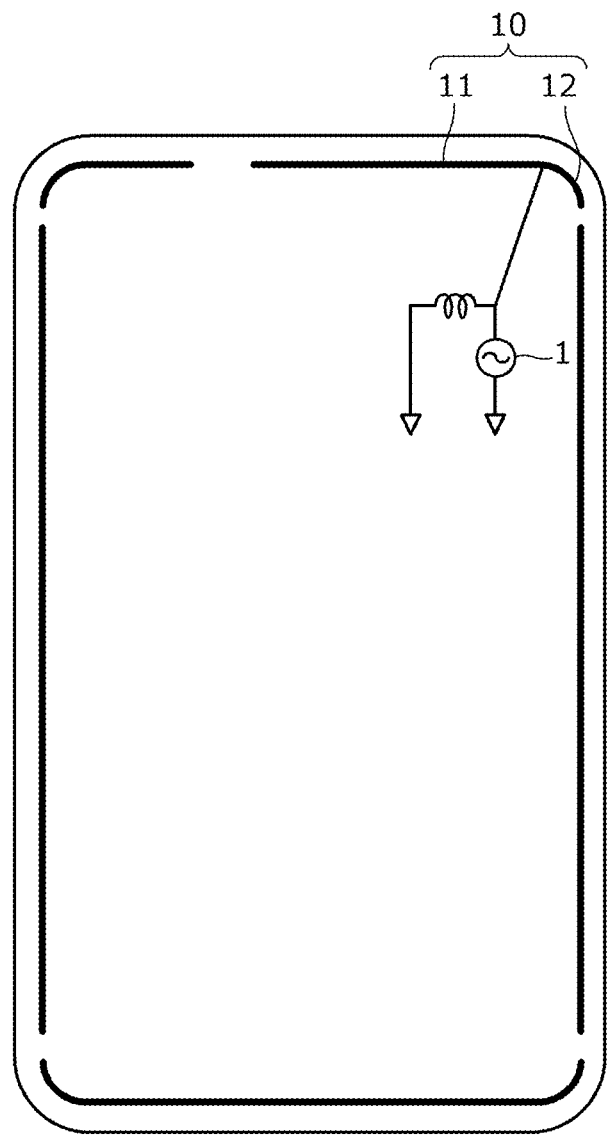
FIG. 20 is a diagram illustrating the antenna unit not including a parasitic radiating element according to the comparative example.

Here, an antenna unit according to a comparative example is illustrated in FIG. 20. The antenna unit of the comparative example is an antenna unit not including the coupling element 30 and the parasitic radiating element 21 illustrated in FIG. 1. The feeder circuit 1 is connected to the feeding radiating element 10.

Figure 2:
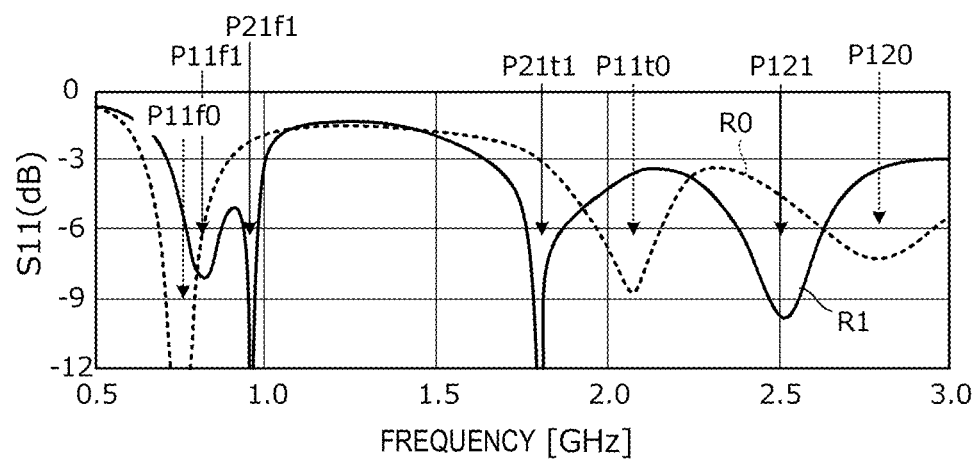
FIG. 2 is a diagram illustrating the frequency characteristics of the reflection coefficients of antenna units with respect to a feeder circuit in terms of the antenna unit 101 of the first preferred embodiment of the present invention illustrated in FIG. 1 and an antenna unit according to a comparative example illustrated in FIG. 20.

FIG. 2 is a diagram illustrating the frequency characteristics of the reflection coefficients of antenna units with respect to the feeder circuit 1 in terms of the antenna unit 101 of the first preferred embodiment illustrated in FIG. 1 and the antenna unit according to the comparative example illustrated in FIG. 20. In FIG. 2, a characteristic R1 indicates the frequency characteristics of the reflection coefficient of the antenna unit 101 of the first preferred embodiment. Further, a characteristic R0 indicates the frequency characteristics of the reflection coefficient of the antenna unit of the comparative example.

First, with regard to the antenna unit of the first preferred embodiment, in FIG. 2, P11/1 indicates a pole by the fundamental wave resonance of the long portion 11 of the feeding radiating element 10, and P121 indicates a pole by the resonance of the short portion 12 of the feeding radiating element 10. Further, P21/1 indicates a pole by the fundamental wave resonance of the parasitic radiating element 21, and P21t1 indicates a pole by the third harmonic wave resonance of the parasitic radiating element 21.

With regard to the antenna unit of the comparative example, in FIG. 2, P11/0 indicates a pole by the fundamental wave resonance of the long portion 11 of the feeding radiating element 10, P11t0 indicates a pole by the third harmonic wave resonance of the long portion 11 of the feeding radiating element 10, and P120 indicates a pole by the resonance of the short portion 12 of the feeding radiating element 10.

In the antenna unit of the comparative example, the pole is generated at the frequency indicated by P11/0 (around 750 MHz) in the low band (about 700 MHz to about 960 MHz), and poles are generated at the frequency indicated by P11t0 (around 2.1 GHz) and the frequency indicated by P120 (around 2.75 GHz) in the high band (about 1.71 GHz to about 2.69 GHz).

In the antenna unit according to the comparative example, the band width is insufficient to cover the low band (about 700 MHz to about 960 MHz) and the high band (about 1.71 GHz to about 2.69 GHz).

In the antenna unit 101 of the first preferred embodiment, the fundamental wave resonance of the long portion 11 of the feeding radiating element 10 (P11/1) is allocated to the low frequency side in the low band, and the fundamental wave resonance of the parasitic radiating element 21 (P21/1) is allocated to the high frequency side in the low band. Accordingly, the low band is broadened. Further, the third harmonic wave resonance of the parasitic radiating element 21 (P21t1) is allocated to the low frequency side in the high band, and the resonance of the short portion 12 of the feeding radiating element 10 (P121) is allocated to the high frequency side in the high band. Thus, the high band is broadened.

Figure 3:
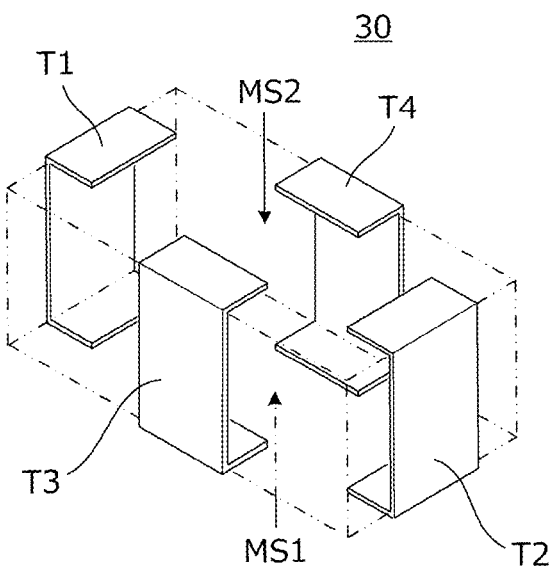
FIG. 3 is a perspective view of a coupling element 30 according to the first preferred embodiment of the present invention.

FIG. 3 is a perspective view of the coupling element 30 according to the first preferred embodiment. The coupling element 30 is a rectangular parallelepiped or substantially rectangular parallelepiped chip component that is mounted on the circuit board in the electronic device. In FIG. 3, the contour of the coupling element 30 is indicated by the dashed-and-double-dotted line. Inside the coupling element 30, the first coil and the second coil, which are described later, are provided. On the exterior surface of the coupling element 30, the terminals T1 and T2 that are connected to the respective ends of the first coil, and the terminals T3 and T4 that are connected to the respective ends of the second coil are provided. Further, the coupling element 30 includes a first surface MS1 and a second surface MS2 opposite to the first surface, and is surface-mounted with one of the surfaces facing the circuit board.

Figure 5:
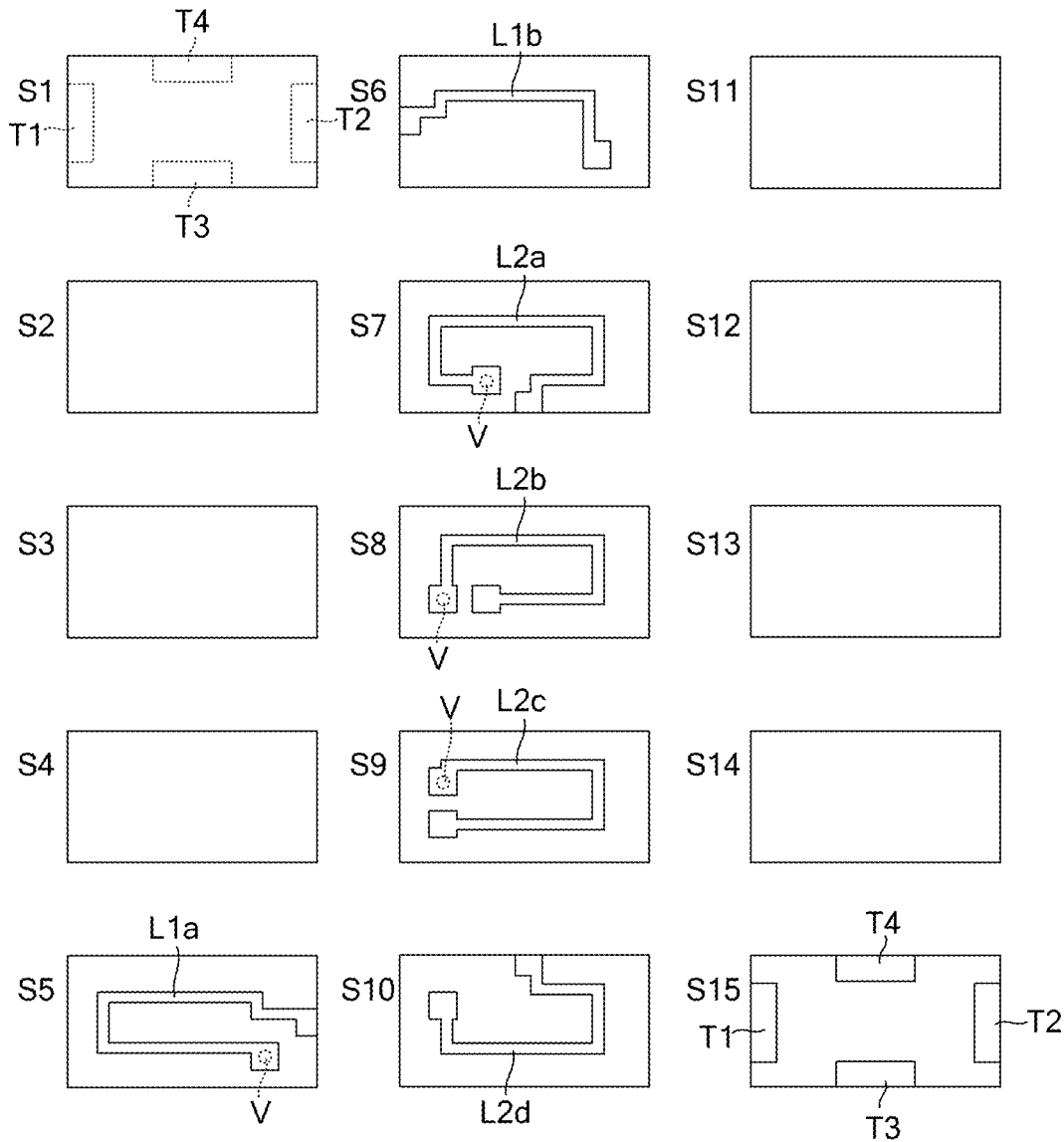
FIG. 5 is an exploded plan view illustrating conductor patterns provided on the respective layers of the coupling element 30 that are different from the examples illustrated in FIG. 4.

FIG. 4 and FIG. 5 are exploded plan views illustrating conductor patterns provided on the respective layers of the coupling element 30. FIG. 4 and FIG. 5 are different from each other in some conductor patterns provided on the respective layers of the coupling element 30.

In FIG. 4 and FIG. 5, the terminals T1, T2, T3, and T4 are provided on the lower surface of an insulating substrate S1, which is the bottom layer, and the upper surface of an insulating substrate 515. The terminals T1, T2, T3, and T4 are also provided on the side surfaces of insulating substrates S2 to S14 after the substrates have been stacked. Conductor patterns L1a and L1b are provided on the upper surfaces of the insulating substrates S5 and S6. Conductor patterns L2a to L2d are provided on the upper surfaces of the insulating substrates S7 to S10.

One end of the conductor pattern L1a is connected to the terminal T2 with an interlayer connection conductor provided on the side surface of the multilayer body provided therebetween. The other end of the conductor pattern L1a is connected to one end of the conductor pattern L1b with an interlayer connection conductor V interposed therebetween. Further, the other end of the conductor pattern L1b is connected to the terminal T1 with an interlayer connection conductor provided on the side surface of the multilayer body interposed therebetween.

One end of the conductor pattern L2a is connected to the terminal T3 with an interlayer connection conductor provided on the side surface of the multilayer body interposed therebetween. The other end of the conductor pattern L2a is connected to one end of the conductor pattern L2b with the interlayer connection conductor V interposed therebetween. The other end of the conductor pattern L2b is connected to one end of the conductor pattern L2c with the interlayer connection conductor V interposed therebetween. The other end of the conductor pattern L2c is connected to one end of the conductor pattern L2d with the interlayer connection conductor V interposed therebetween. Further, the other end of the conductor pattern L2d is connected to the terminal T4 with an interlayer connection conductor provided on the side surface of the multilayer body interposed therebetween.

The above-mentioned conductor patterns L1a and L1b and the interlayer connection conductors interlayer connecting the conductor patterns L1a and L1b define the first coil L1. The conductor patterns L2a to L2d and the interlayer connection conductors interlayer connecting the conductor patterns L2a to L2d define the second coil L2. In the plan view of the multilayer body, the coil openings of the first coil L1 and the second coil L2 overlap each other. The number of turns of the second coil L2 is larger than the number of turns of the first coil L1, and the self-inductance of the second coil L2 is larger than the self-inductance of the first coil L1.

The first coil L1 and the second coil L2 are wound so that, as illustrated in FIG. 4, the direction of a magnetic field that is generated at the first coil L1 with a current flowing through the first coil L1 from the terminal T1 to the terminal T2 and the direction of a magnetic field that is generated at the second coil L2 with a current flowing through the second coil L2 from the terminal T3 to the terminal T4 are the same. Thus, with regard to the coupling element illustrated in FIG. 4, with the connections illustrated in FIG. 1, the feeding radiating element 10 and the parasitic radiating element 21 are connected to the coupling element 30 by subtractive polarity connection.

The conductor patterns L1a and L1b are turned upside down between FIG. 4 and FIG. 5. Thus, with the terminals T1 to T4 of the coupling element illustrated in FIG. 5 connected as illustrated in FIG. 1, the feeding radiating element 10 and the parasitic radiating element 21 are connected to the coupling element 30 by additive polarity connection.

Next, combinations of the coupling polarity of the coupling element 30, the resonant mode of the feeding radiating element, and the resonant mode of the parasitic radiating element are described.

FIG. 6 is a diagram illustrating four combinations of the resonant mode of the feeding radiating element, the resonant mode of the parasitic radiating element, and the coupling polarity of the coupling element 30 in terms of the low band. In FIG. 6, the plus signs and the minus signs indicate the potential of the open end 11E of the long portion 11 of the feeding radiating element 10 and the potential of the open end 21E of the parasitic radiating element 21.

Here, relationships between the four combinations described above and the characteristics are depicted in Table 1.

TABLE 1

| Condition | Transformer polarity | Low band | | Characteristics |
| --- | --- | --- | --- | --- |
| | | Low frequency side | High frequency side | |
| C1 | Additive polarity | Parasitic element fundamental wave | Long portion fundamental wave | ○ |
| C2 | | Long portion fundamental wave | Parasitic element fundamental wave | x |
| C3 | Subtractive polarity | Parasitic element fundamental wave | Long portion fundamental wave | x |
| C4 | | Long portion fundamental wave | Parasitic element fundamental wave | ○ |

In Conditions C1 and C2, the coupling polarity of the coupling element 30 is the additive polarity. In Conditions C3 and C4, the coupling polarity of the coupling element 30 is the subtractive polarity. Further, in Conditions C1 and C3, the fundamental wave frequency of the parasitic radiating element 21 corresponds to the low frequency side in the low band, and the fundamental wave frequency of the long portion 11 of the feeding radiating element 10 corresponds to the high frequency side in the low band. In Conditions C2 and C4, the fundamental wave frequency of the long portion 11 of the feeding radiating element 10 corresponds to the low frequency side in the low band, and the fundamental wave frequency of the parasitic radiating element 21 corresponds to the high frequency side in the low band.

In Conditions C2 and C3, as illustrated in FIG. 6, the potential of the open end 11E of the long portion 11 of the feeding radiating element 10 and the potential of the open end 21E of the parasitic radiating element 21 have the opposite polarities, and the interval between the two open ends is small in the frequency band in the low band, with the result that the potential of the long portion 11 of the feeding radiating element 10 and the potential of the parasitic radiating element 21 offset each other. The radiant efficiency in the low band is thus low.

Meanwhile, in Conditions C1 and C4, as illustrated in FIG. 6, the potential of the open end 11E of the long portion 11 of the feeding radiating element 10 and the potential of the open end 21E of the parasitic radiating element 21 have the same polarity, and the interval between the two open ends is small in the frequency band in the low band, with the result that the radiant efficiency in the low band is high.

FIG. 7 is a diagram illustrating four combinations of the resonant mode of the feeding radiating element, the resonant mode of the parasitic radiating element, and the coupling polarity of the coupling element 30 in terms of the high band. In FIG. 7, the plus signs and the minus signs indicate the potential of the open end 12E of the short portion 12 of the feeding radiating element 10 and the potential of the open end 21E of the parasitic radiating element 21.

Here, relationships between the four combinations described above and the characteristics are depicted in Table 2.

TABLE 2

| Condition | Transformer polarity | High band | | Characteristics |
| --- | --- | --- | --- | --- |
| | | Low frequency side | High frequency side | |
| C5 | Additive polarity | Parasitic element third harmonic wave | Short portion fundamental wave | x |
| C6 | | Short portion fundamental wave | Parasitic element third harmonic wave | ○ |
| C7 | Subtractive polarity | Parasitic element third harmonic wave | Short portion fundamental wave | ○ |
| C8 | | Short portion fundamental wave | Parasitic element third harmonic wave | x |

In Conditions C5 and C6, the coupling polarity of the coupling element 30 is the additive polarity. In Conditions C7 and C8, the coupling polarity of the coupling element 30 is the subtractive polarity. Further, in Conditions C5 and C7, the third harmonic wave frequency of the parasitic radiating element 21 corresponds to the low frequency side in the high band, and the fundamental wave frequency of the short portion 12 of the feeding radiating element 10 corresponds to the high frequency side in the high band. In Conditions C6 and C8, the fundamental wave frequency of the short portion 12 of the feeding radiating element 10 corresponds to the low frequency side in the high band, and the third harmonic wave frequency of the parasitic radiating element 21 corresponds to the high frequency side in the high band. Note that, in the third harmonic wave resonance of the parasitic radiating element 21, ¾ wave length potentials are distributed in the parasitic radiating element 21, but in FIG. 7, the illustration of the potentials in the middle of the parasitic radiating element 21 is omitted.

In Conditions C5 and C8, as illustrated in FIG. 7, the potential of the open end 12E of the short portion 12 of the feeding radiating element 10 and the potential of the open end 21E of the parasitic radiating element 21 have the opposite polarities, and the interval between the two open ends is small in the frequency band in the high band, with the result that the potential of the short portion 12 of the feeding radiating element 10 and the potential of the parasitic radiating element 21 offset each other. The radiant efficiency in the high band is thus low.

Meanwhile, in Conditions C6 and C7, as illustrated in FIG. 7, the potential of the open end 12E of the short portion 12 of the feeding radiating element 10 and the potential of the open end 21E of the parasitic radiating element 21 have the same polarity, and the interval between the two open ends is small in the frequency band in the high band, with the result that the radiant efficiency in the high band is high.

The examples illustrated in FIG. 1 and FIG. 2 correspond to the examples in Conditions C4 and C7 described above. Thus, the low band and the high band are both broadened.

Note that, in FIG. 1, frame grounds 41 and 42 are connected to the ground potential of the electronic device 201. Further, the electronic device 201 includes other feeding radiating elements 51 and 52 in addition to the feeding radiating element 10. The other feeding radiating elements 51 and 52 are connected to respective other feeder circuits 2 and 3, thus being used as antennas. The other feeding radiating element 51 is provided as a diversity antenna together with the feeding radiating element 10 or as an antenna for carrier aggregation, for example. The other feeding radiating element 52 is provided as an antenna for wireless LANs and an antenna for GPS, for example.

Second Preferred Embodiment

In a second preferred embodiment of the present invention, features are described to provide the potential of the open end of a parasitic radiating element and the potential of the open end of the long portion of a feeding radiating element with the same polarity.

Figure 8A:
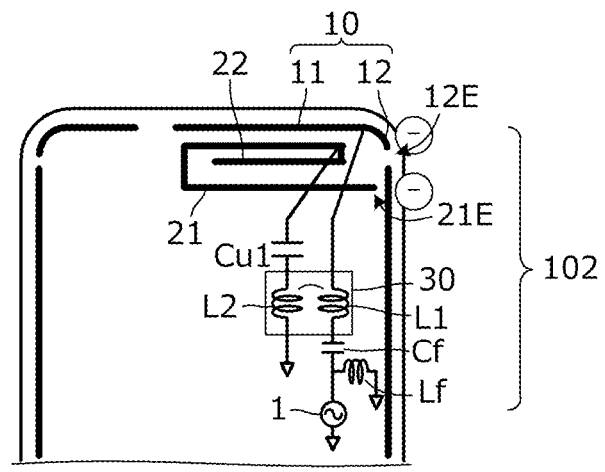
FIG. 8A is a diagram illustrating an antenna unit 102 according to a second preferred embodiment of the present invention.
Figure 8B:
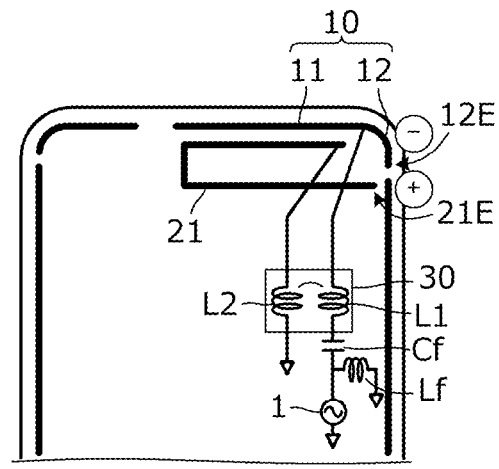
FIG. 8B is a diagram illustrating an antenna unit for comparison.

FIG. 8A is a diagram illustrating an antenna unit 102 according to the second preferred embodiment, and FIG. 8B is a diagram illustrating an antenna unit for comparison.

The antenna unit 102 includes the coupling element 30 including the first coil L1 and the second coil L2, the feeding radiating element 10, the parasitic radiating element 21, and an auxiliary parasitic radiating element 22. The auxiliary parasitic radiating element 22 includes a conductor pattern provided on the surface of the resin molded structure by LDS, for example, together with the parasitic radiating element 21.

Between the feeder circuit 1 and the first coil L1, an impedance matching circuit including a capacitor Cf in series connection and an inductor Lf connected to the ground by shunt connection is provided. The remaining features are the same as or similar to the features of the antenna units described in the first preferred embodiment.

Therefore, the matching circuit may be provided at the connection portion between the feeder circuit 1 and the first coil L1. Accordingly, appropriate impedance matching of the feeder circuit 1 and the first coil L1 is able to be provided.

The antenna unit for comparison illustrated in FIG. 8B is the same as or similar to the antenna unit 101 described in the first preferred embodiment except that an impedance matching circuit is connected between the feeder circuit 1 and the first coil L1.

Figure 9A:
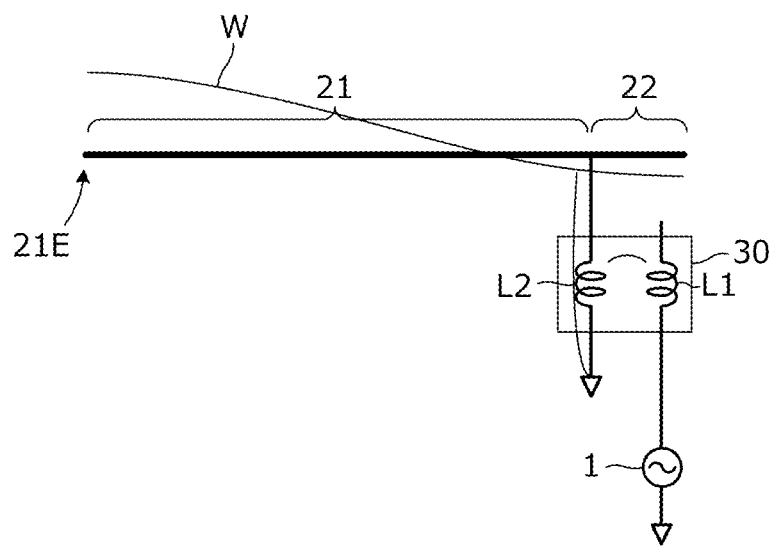
FIG. 9A is a diagram illustrating the strength of potentials distributed in a parasitic radiating element 21 and an auxiliary parasitic radiating element 22 in the antenna unit illustrated in FIG. 8A.
Figure 9B:
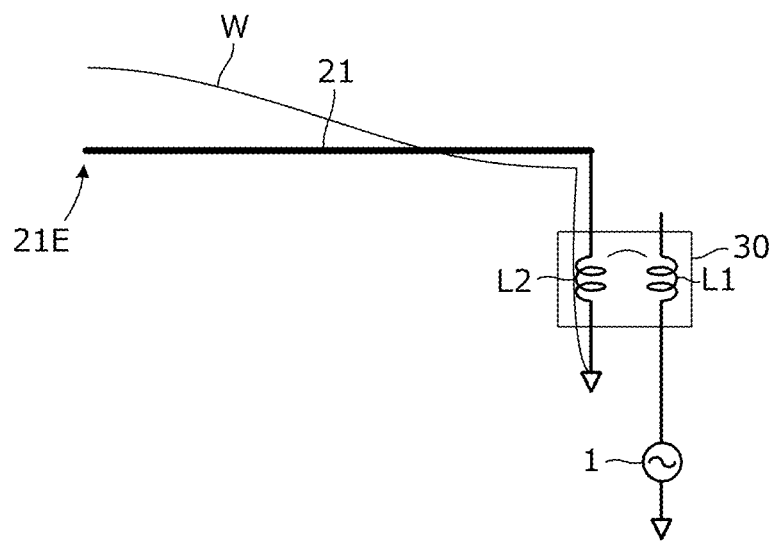
FIG. 9B is a diagram illustrating the strength of potentials distributed in the parasitic radiating element 21 in the antenna unit illustrated in FIG. 8B.

FIG. 9A is a diagram illustrating the strength of potentials in third harmonic wave resonance distributed in the parasitic radiating element 21 and the auxiliary parasitic radiating element 22 in the antenna unit illustrated in FIG. 8A. Further, FIG. 9B is a diagram illustrating the strength of potentials distributed in the parasitic radiating element 21 in the antenna unit illustrated in FIG. 8B. In FIGS. 9A and 9B, the parasitic radiating element 21 and the auxiliary parasitic radiating element 22 are unwound into straight lines. In FIG. 9A, a sine curve W indicates potentials in third harmonic wave resonance distributed in the parasitic radiating element 21, the auxiliary parasitic radiating element 22, and the second coil L2 according to the second preferred embodiment. Further, in FIG. 9B, the sine curve W indicates potentials in third harmonic wave resonance distributed in the parasitic radiating element 21 and the second coil L2 according to the comparative example.

In the antenna unit of the comparative example illustrated in FIG. 8B, the second coil L2 and the parasitic radiating element 21 cause third harmonic wave resonance. Meanwhile, according to the antenna unit 102 of the second preferred embodiment, the conductor from the open end of the parasitic radiating element 21 to the open end of the auxiliary parasitic radiating element 22 resonates (the wave length of potentials on the parasitic radiating element 21 and the auxiliary parasitic radiating element 22 is extended) so that, as compared to the antenna unit of the comparative example illustrated in FIG. 8B, the frequency of third harmonic wave resonance of the parasitic radiating element drops. Accordingly, the low frequency side in the high band is able to be expanded more toward the low frequency direction.

Figure 10:
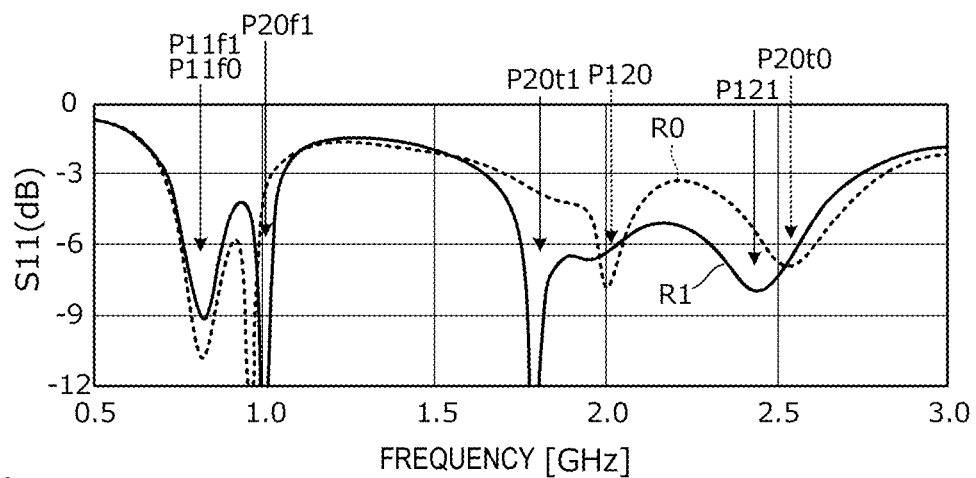
FIG. 10 is a diagram illustrating the frequency characteristics of the reflection coefficients of antenna units with respect to the feeder circuit 1 in terms of the antenna unit 102 of the second preferred embodiment of the present invention illustrated in FIG. 8A and the antenna unit according to the comparative example illustrated in FIG. 8B.

FIG. 10 is a diagram illustrating the frequency characteristics of the reflection coefficients of antenna units with respect to the feeder circuit 1 in terms of the antenna unit 101 of the second preferred embodiment illustrated in FIG. 8A and the antenna unit according to the comparative example illustrated in FIG. 8B. In FIG. 10, the characteristic R1 indicates the frequency characteristics of the reflection coefficient of the antenna unit 101 of the second preferred embodiment. Further, the characteristic R0 indicates the frequency characteristics of the reflection coefficient of the antenna unit of the comparative example.

First, the characteristics of the antenna unit of the second preferred embodiment are as follows. In FIG. 10, P11/1 indicates a pole by the fundamental wave resonance of the long portion 11 of the feeding radiating element 10, P20/1 indicates a pole by the fundamental wave resonance of the parasitic radiating element 21 and the auxiliary parasitic radiating element 22, and P20t1 indicates a pole by the third harmonic wave resonance of the parasitic radiating element 21 and the auxiliary parasitic radiating element 22. Further, P121 indicates a pole by the resonance of the short portion 12 of the feeding radiating element 10.

With regard to the antenna unit of the comparative example, in FIG. 10, P11/0 indicates a pole by the fundamental wave resonance of the long portion 11 of the feeding radiating element 10, and P120 indicates a pole by the resonance of the short portion 12 of the feeding radiating element 10. P21t0 indicates a pole by the third harmonic wave resonance of the parasitic radiating element 21.

In the antenna unit 102 of the second preferred embodiment illustrated in FIG. 8A, the frequencies of third harmonic wave resonance of the parasitic radiating element 21 and the auxiliary parasitic radiating element 22 are low. Further, the short portion 12 is shorter than the short portion 12 of the antenna unit according to the comparative example illustrated in FIG. 8B. Accordingly, as illustrated in FIG. 10, frequencies around 1.7 GHz are covered by the third harmonic wave resonance of the parasitic radiating element 21 and the auxiliary parasitic radiating element 22, and frequencies around 2.4 GHz are covered by the resonance of the short portion 12 of the feeding radiating element 10. That is, the antenna unit 102 of the second preferred embodiment and the antenna unit according to the comparative example are upside down in terms of the frequency band allocation in the high band.

With regard to the frequency band allocation in the high band described above, while the potential of the open end 12E of the short portion 12 and the potential of the open end 21E of the parasitic radiating element 21 have the opposite polarities in the antenna unit according to the comparative example illustrated in FIG. 8B, in the antenna unit 102 of the second preferred embodiment, the potential of the open end 12E of the short portion 12 and the potential of the open end 21E of the parasitic radiating element 21 have the same polarity. Note that, in the example illustrated in FIG. 8A, a capacitor Cu1 is connected between the parasitic radiating element 21 and the second coil L2 to finely adjust the resonant frequencies of the parasitic radiating element 21 and the auxiliary parasitic radiating element 22.

Figure 11:
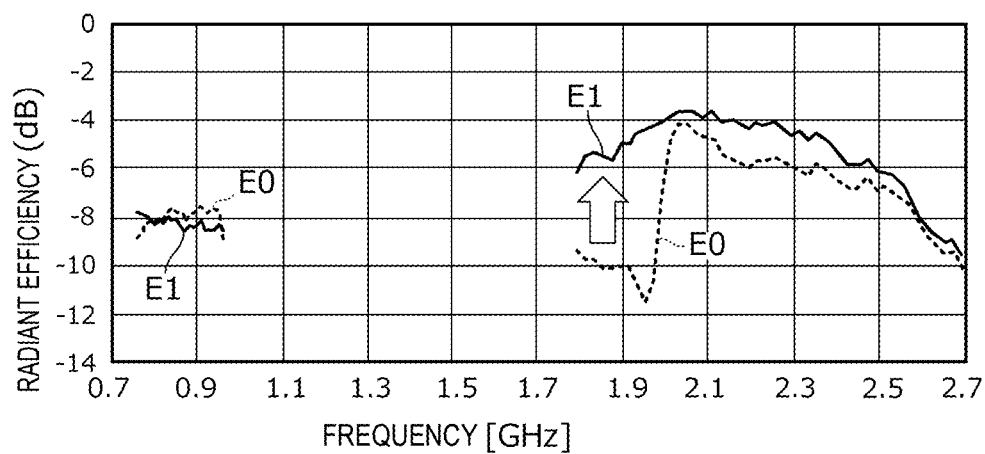
FIG. 11 is a diagram illustrating the frequency characteristics of the radiant efficiencies of the antenna unit 102 of the second preferred embodiment of the present invention and the antenna unit of the comparative example.

FIG. 11 is a diagram illustrating the frequency characteristics of the radiant efficiencies of the antenna unit 102 of the second preferred embodiment and the antenna unit of the comparative example. In FIG. 11, E0 indicates the characteristics of the antenna unit of the comparative example, and E1 indicates the characteristics of the antenna unit 102 of the second preferred embodiment. In the antenna unit 102 of the second preferred embodiment, the frequencies of third harmonic wave resonance of the parasitic radiating element 21 and the auxiliary parasitic radiating element 22 are relatively low, and hence the radiant efficiency in the low frequency band in the high band (from 1.8 GHz to 2.2 GHz) is high. Accordingly, favorable characteristics are able to be provided over the entire mobile communication band.

Third Preferred Embodiment

In a third preferred embodiment of the present invention, there is described some features to determine the resonant frequency of the parasitic radiating element 21 to a predetermined frequency.

Figure 12A:
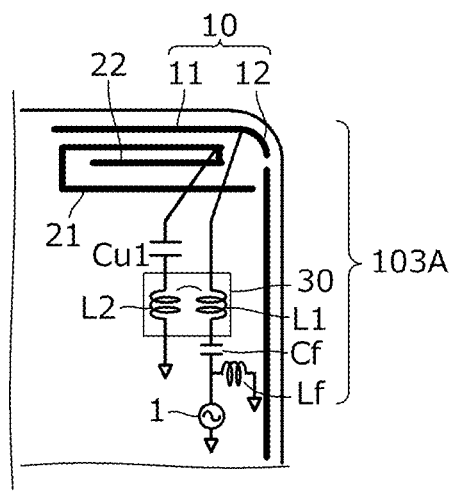
FIGS. 12A to 12D are diagrams illustrating antenna units 103A, 103B, 103C, and 103D according to a third preferred embodiment of the present invention.
Figure 12B:
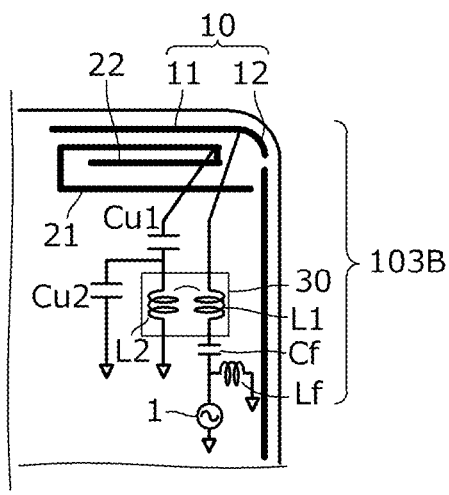
Figure 12C:
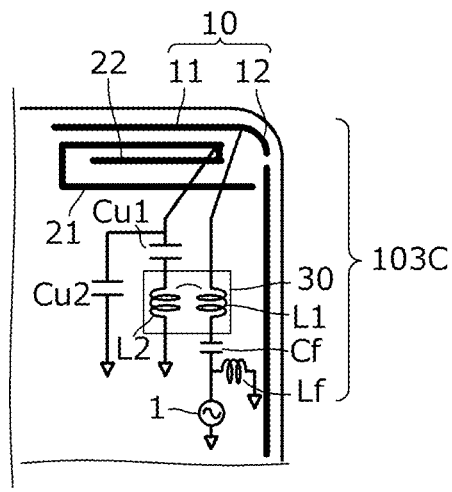
Figure 12D:
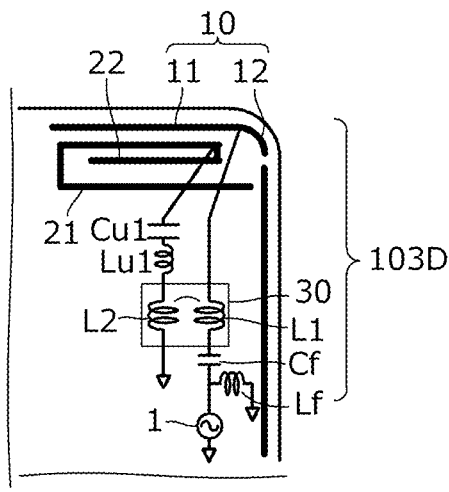

FIG. 12A is a diagram illustrating an antenna unit 103A according to the third preferred embodiment. FIG. 12B is a diagram illustrating an antenna unit 103B according to the third preferred embodiment. FIG. 12C is a diagram illustrating an antenna unit 103C according to the third preferred embodiment. FIG. 12D is a diagram illustrating an antenna unit 103D according to the third preferred embodiment.

In the antenna unit 103A, the capacitor Cu1 is connected between the parasitic radiating element 21 and the second coil L2 in series. Accordingly, the frequency of fundamental wave resonance of the parasitic radiating element 21 is able to be increased. Thus, a frequency band in the low band that is covered by the third harmonic wave resonant frequency of the parasitic radiating element 21 is able to be increased.

In the antenna units 103B and 103C, a capacitor Cu2 is connected by shunt connection between the ground and the connection path between the parasitic radiating element 21 and the second coil L2. In the antenna unit 103B, the capacitor Cu2 is connected between the ground and the connection point between the capacitor Cu1 and the second coil L2 connected in series. In the antenna unit 103C, the capacitor Cu2 is connected between the ground and the connection point between the capacitor Cu1 and the parasitic radiating element 21 connected in series.

In the antenna units 103B and 103C described above, with the capacitor Cu2, the frequency of harmonic wave resonance of the parasitic radiating element 21 is able to be reduced. Since the impedance of the capacitor Cu2 is small in the low band, the fundamental wave frequency of the parasitic radiating element 21 is less affected.

In the antenna unit 103D, an LC resonant circuit including the capacitor Cu1 and an inductor Lu1 is connected between the parasitic radiating element 21 and the second coil L2. Accordingly, the frequency of fundamental wave resonance of the parasitic radiating element 21 is able to be adjusted.

Although the parasitic radiating element 21 is provided with the auxiliary parasitic radiating element 22 in the examples illustrated in FIGS. 12A to 12D, the capacitor Cu1 or the capacitor Cu2 may be provided in a circuit that does not include the auxiliary parasitic radiating element 22.

Note that, the matching circuit including the capacitor Cf and the inductor Lf may be provided between the first coil L1 and the feeding radiating element 10. Accordingly, impedance matching between the first coil L1 and the feeding radiating element 10 is able to be provided.

Fourth Preferred Embodiment

In a fourth preferred embodiment of the present invention, an antenna unit including an auxiliary feeding radiating element is shown.

Figure 13:
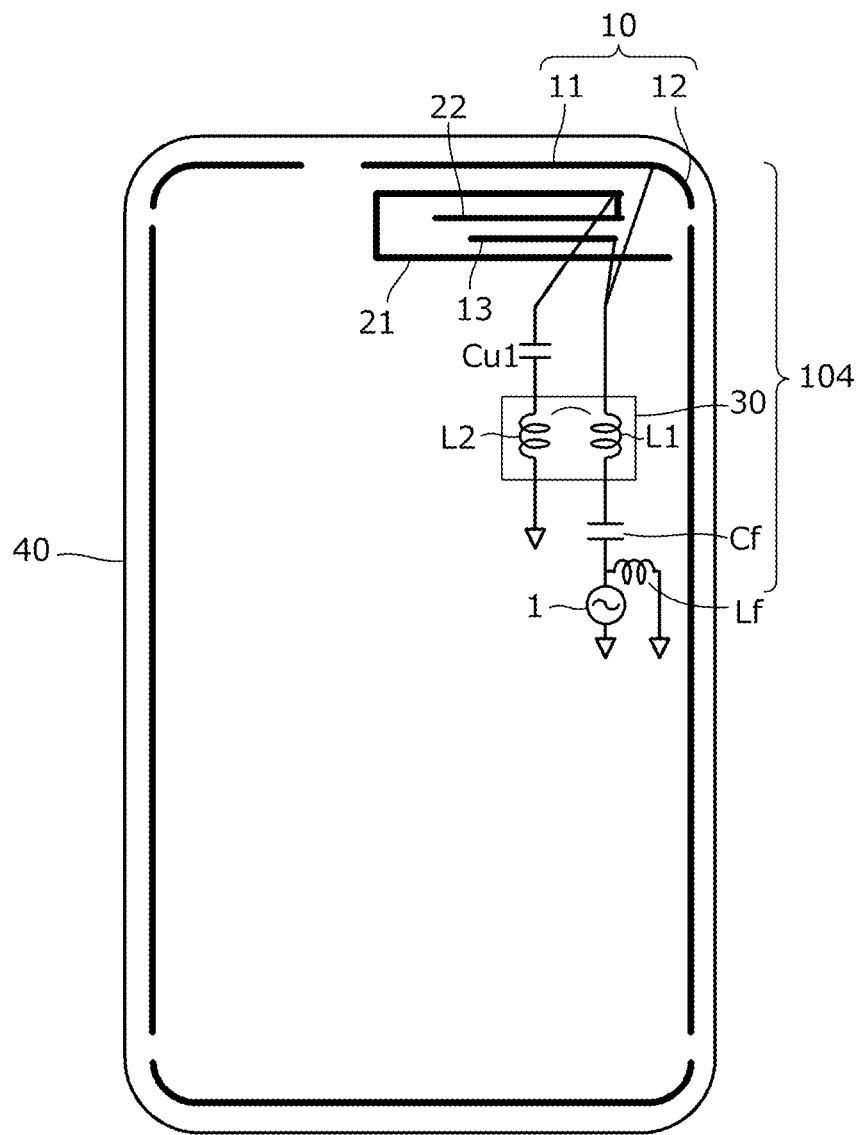
FIG. 13 is a diagram illustrating an antenna unit 104 according to a fourth preferred embodiment of the present invention.

FIG. 13 is a diagram illustrating an antenna unit 104 according to the fourth preferred embodiment. The antenna unit 104 includes the coupling element 30 including the first coil L1 and the second coil L2, the feeding radiating element 10, an auxiliary feeding radiating element 13, the parasitic radiating element 21, and the auxiliary parasitic radiating element 22. The auxiliary feeding radiating element 13 includes a conductor pattern provided on the surface of the resin molded structure by LDS, for example, together with the parasitic radiating element 21 and the auxiliary parasitic radiating element 22.

Figure 14:
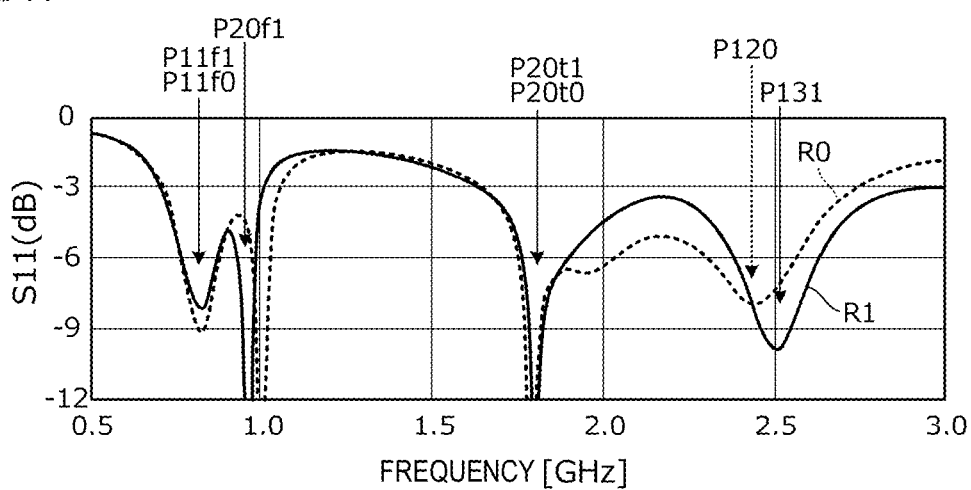
FIG. 14 is a diagram illustrating the frequency characteristics of the reflection coefficients of antenna units with respect to the feeder circuit 1 in terms of the antenna unit 104 of the fourth preferred embodiment of the present invention illustrated in FIG. 13 and an antenna unit not including an auxiliary feeding radiating element 13 according to a comparative example.

FIG. 14 is a diagram illustrating the frequency characteristics of the reflection coefficients of antenna units with respect to the feeder circuit 1 in terms of the antenna unit 104 of the fourth preferred embodiment illustrated in FIG. 13 and an antenna unit not including the auxiliary feeding radiating element 13 according to a comparative example. In FIG. 14, the characteristic R1 indicates the frequency characteristics of the reflection coefficient of the antenna unit 104 of the fourth preferred embodiment. Further, the characteristic R0 indicates the frequency characteristics of the reflection coefficient of the antenna unit of the comparative example.

In FIG. 14, P11/1 indicates a pole by the fundamental wave resonance of the long portion 11 of the feeding radiating element 10 of the antenna unit 104 of the fourth preferred embodiment, and P11/0 indicates a pole by the fundamental wave resonance of the long portion 11 of the feeding radiating element 10 of the antenna unit of the comparative example. Further, P20/1 indicates a pole by the fundamental wave resonance of the parasitic radiating element 21 and the auxiliary parasitic radiating element 22 of the antenna unit 104 of the fourth preferred embodiment. P20t1 indicates a pole by the third harmonic wave resonance of the parasitic radiating element 21 and the auxiliary parasitic radiating element 22 of the antenna unit 104 of the fourth preferred embodiment, and P20t0 indicates a pole by the third harmonic wave resonance of the parasitic radiating element 21 and the auxiliary parasitic radiating element 22 of the antenna unit of the comparative example. Further, P120 indicates a pole by the resonance of the short portion 12 of the feeding radiating element of the antenna unit of the comparative example, and P131 indicates a pole by the resonance of the auxiliary feeding radiating element 13 of the antenna unit 104 of the fourth preferred embodiment. The resonant frequency of the auxiliary feeding radiating element 13 is set to the high frequency side in the high band.

Figure 15:
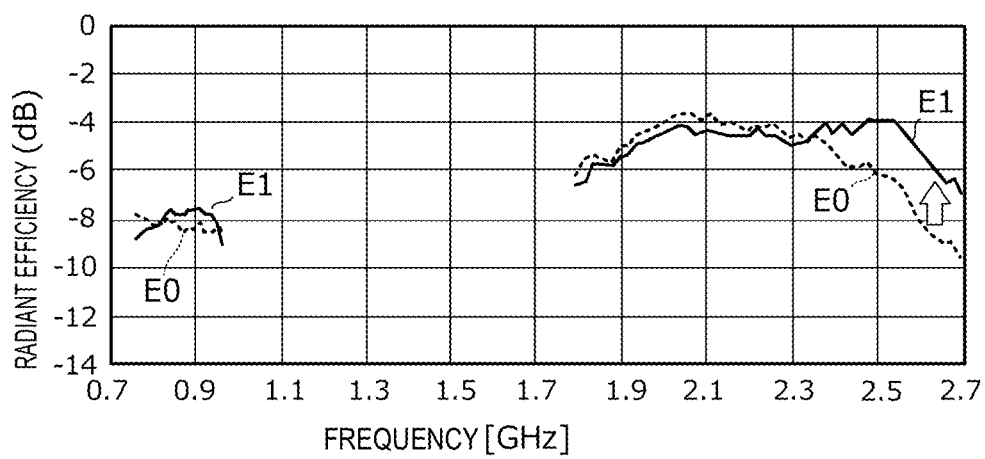
FIG. 15 is a diagram illustrating the frequency characteristics of the radiant efficiencies of the antenna unit 104 of the fourth preferred embodiment of the present invention and the antenna unit of the comparative example.

FIG. 15 is a diagram illustrating the frequency characteristics of the radiant efficiencies of the antenna unit 104 of the fourth preferred embodiment and the antenna unit of the comparative example. In FIG. 15, E0 indicates the characteristics of the antenna unit of the comparative example, and E1 indicates the characteristics of the antenna unit 104 of the fourth preferred embodiment.

In the antenna unit 104 of the fourth preferred embodiment illustrated in FIG. 13, the resonance of the auxiliary feeding radiating element 13 is added so that the high frequency side in the high band is more broadened.

Fifth Preferred Embodiment

In a fifth preferred embodiment of the present invention, there is described an antenna unit including a feeding radiating element configured differently from the examples described so far.

Figure 16:
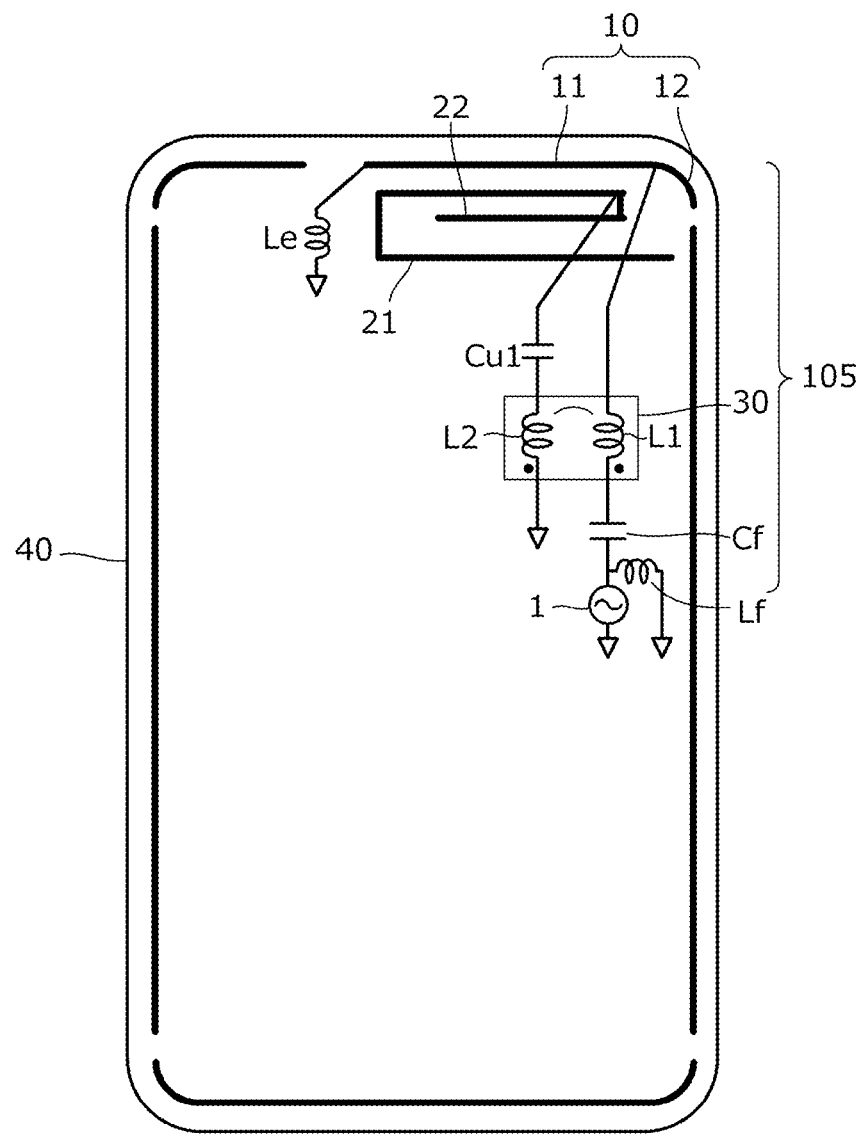
FIG. 16 is a diagram illustrating an antenna unit 105 according to a fifth preferred embodiment of the present invention.

FIG. 16 is a diagram illustrating an antenna unit 105 according to the fifth preferred embodiment. The antenna unit 105 includes the coupling element 30 including the first coil L1 and the second coil L2, the feeding radiating element 10, the parasitic radiating element 21, and the auxiliary parasitic radiating element 22.

Unlike the examples described so far, in the antenna unit 105, the end portion of the long portion 11 of the feeding radiating element 10 is grounded with an inductor Le interposed therebetween. Accordingly, the long portion 11 and the inductor Le define and function as a loop antenna.

When the end portion of the long portion 11 of the feeding radiating element is open, the open end in question is the maximum potential point. When the end portion of the long portion 11 of the feeding radiating element is grounded with the inductor Le interposed therebetween as in the fifth preferred embodiment. However, the maximum potential point is able to be positioned inside the housing 40. This prevents a user operating the electronic device from touching places near the maximum potential point, thereby preventing a deterioration in antenna characteristics due to an approaching human body.

Sixth Preferred Embodiment

In a sixth preferred embodiment of the present invention, there is described an antenna unit including a feeding radiating element configured differently from the examples described so far.

Figure 17:
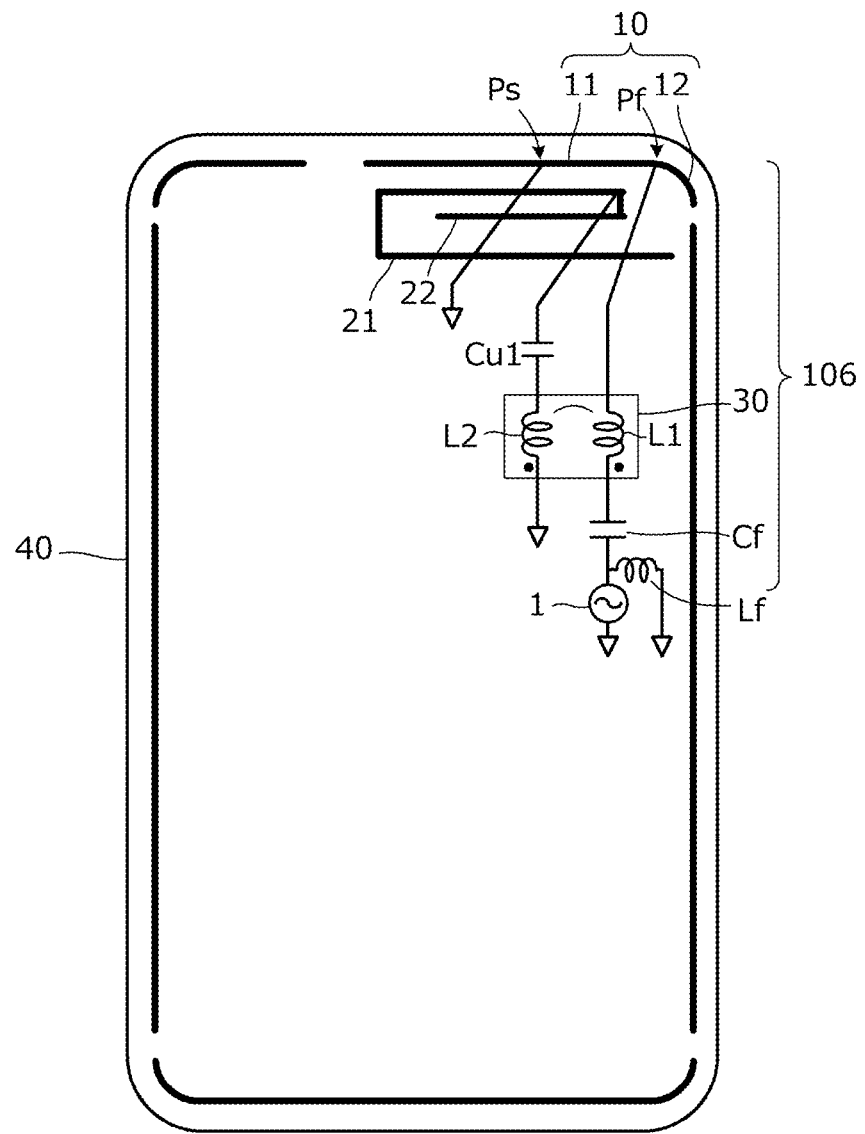
FIG. 17 is a diagram illustrating an antenna unit 106 according to a sixth preferred embodiment of the present invention.

FIG. 17 is a diagram illustrating an antenna unit 106 according to the sixth preferred embodiment. The antenna unit 106 includes the coupling element 30 including the first coil L1 and the second coil L2, the feeding radiating element 10, the parasitic radiating element 21, and the auxiliary parasitic radiating element 22.

Unlike the examples described so far, in the antenna unit 106, the long portion 11 of the feeding radiating element 10 is an inverted-F antenna (IFA) including a grounded portion Ps provided between a feeding point Pf and the open end of the feeding radiating element.

According to the sixth preferred embodiment, by appropriately setting an interval between the feeding point Pf and the grounded portion Ps, the impedance of the feeding radiating element 10 with respect to the feeding point Pf is able to be set to a predetermined impedance.

Seventh Preferred Embodiment

In a seventh preferred embodiment of the present invention, there is described an antenna unit in which the connection structure of a feeder circuit to a feeding radiating element is different from the examples described so far.

Figure 18:
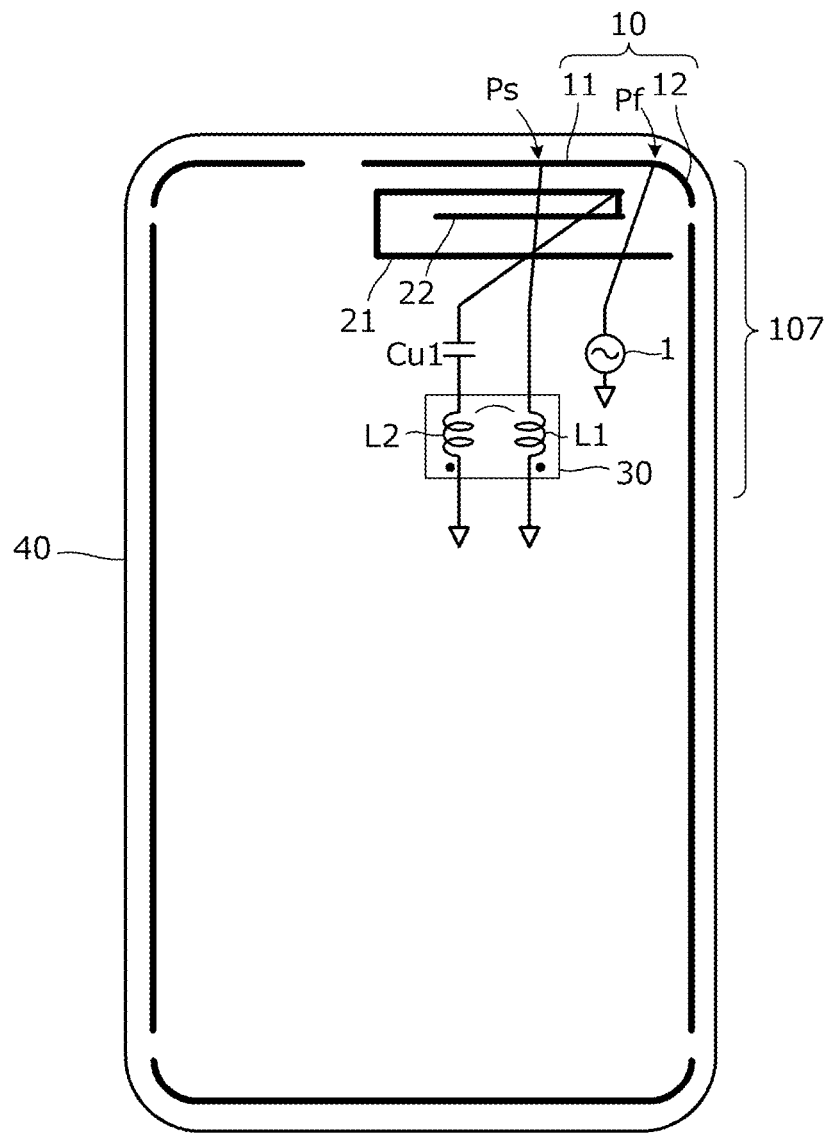
FIG. 18 is a diagram illustrating an antenna unit 107 according to a seventh preferred embodiment of the present invention.

FIG. 18 is a diagram illustrating an antenna unit 107 according to the seventh preferred embodiment. The antenna unit 107 includes the coupling element 30 including the first coil L1 and the second coil L2, the feeding radiating element 10, the parasitic radiating element 21, and the auxiliary parasitic radiating element 22.

In the antenna unit 107, the long portion 11 of the feeding radiating element 10 is an IFA including the grounded portion Ps provided between the feeding point Pf and the open end of the feeding radiating element. The feeder circuit 1 is directly connected to the feeding point Pf. Further, the first coil L1 is connected between the grounded portion Ps and the ground.

According to the seventh preferred embodiment, since more current flows toward the first coil L1 side of the coupling element 30, an induced electromotive force that is applied to the parasitic radiating element 21 is increased, with the result that the band broadening effect by the parasitic radiating element 21 and the auxiliary parasitic radiating element 22 is increased.

Eighth Preferred Embodiment

In an eighth preferred embodiment of the present invention, there is described an antenna unit that selectively connects a plurality of reactive elements having different reactance values.

FIGS. 19A to 19D are diagrams illustrating antenna units 108A, 108B, 108C, and 108D according to the eighth preferred embodiment. The antenna units 108A, 108B, 108C, and 108D each include the coupling element 30 including the first coil L1 and the second coil L2, the feeding radiating element 10, the parasitic radiating element 21, the auxiliary parasitic radiating element 22, a switch 60, and reactive elements 70.

Figure 19A:
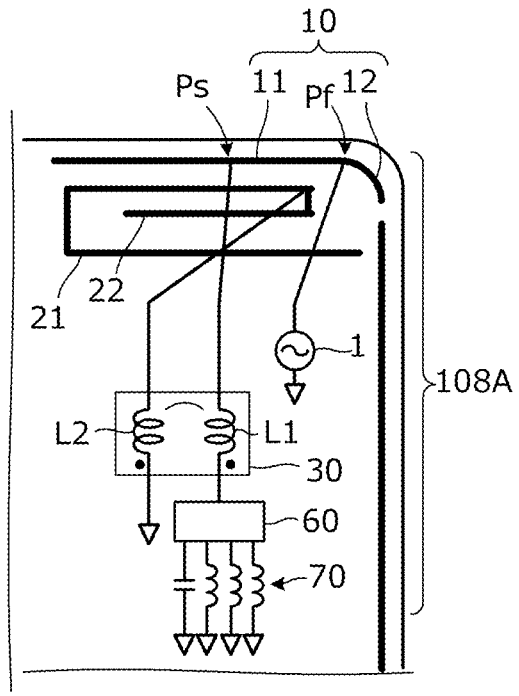
FIGS. 19A to 19D are diagrams illustrating antenna units 108A, 108B, 108C, and 108D according to an eighth preferred embodiment of the present invention.

In the antenna unit 108A illustrated in FIG. 19A, the switch 60 and the plurality of reactive elements 70 are connected between the first coil L1 and the ground. The switch 60 selectively connects a predetermined reactive element of the plurality of reactive elements 70 to the first coil L1. Accordingly, the predetermined reactive element is connected to the first coil L1 in series. That is, reactance to be connected to the grounded portion Ps of the long portion 11 of the feeding radiating element 10 is able to be appropriately selected.

Figure 19B:
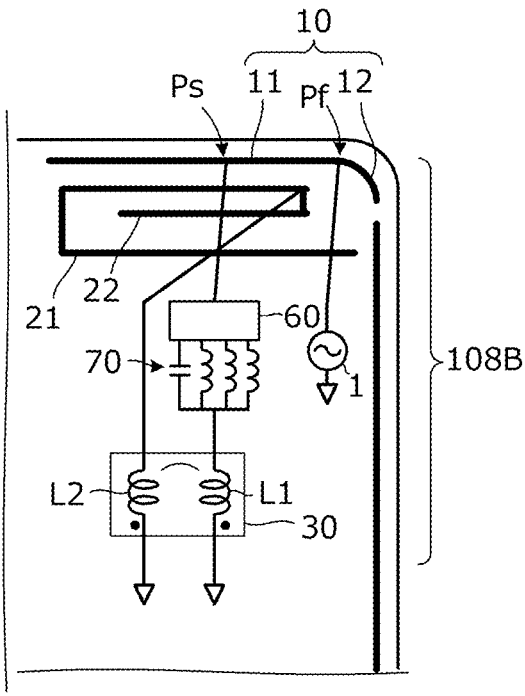

In the antenna unit 108B illustrated in FIG. 19B, the switch 60 and the plurality of reactive elements 70 are connected between the first coil L1 and the grounded portion Ps of the long portion 11 of the feeding radiating element 10. The switch 60 selectively connects a predetermined reactive element of the plurality of reactive elements 70 to the first coil L1. Accordingly, the predetermined reactive element is connected between the first coil L1 and the grounded portion Ps.

In the antenna units 108A and 108B, through the reactive element selection, the frequency of fundamental wave resonance or third harmonic wave resonance of the long portion 11 of the feeding radiating element 10 is able to be switched to further broaden the available band width.

Figure 19C:
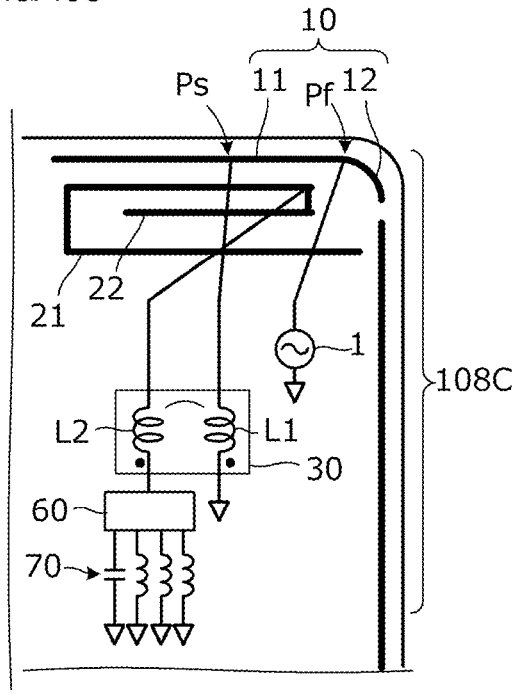

In the antenna unit 108C illustrated in FIG. 19C, the switch 60 and the plurality of reactive elements 70 are connected between the second coil L2 and the ground. The switch 60 selectively connects a predetermined reactive element of the plurality of reactive elements 70 to the second coil L2. Accordingly, the predetermined reactive element is connected to the parasitic radiating element 21 and the auxiliary parasitic radiating element 22 in series.

Figure 19D:
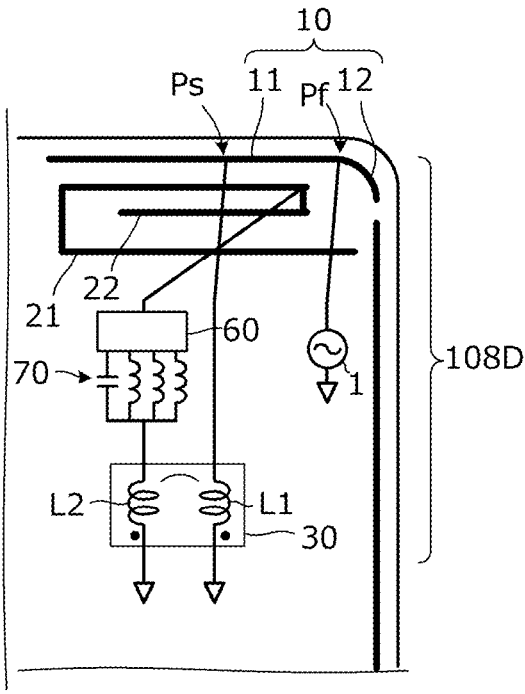

In the antenna unit 108D illustrated in FIG. 19D, the switch 60 and the plurality of reactive elements 70 are connected between the second coil L2 and the parasitic radiating element 21. The switch 60 selectively connects a predetermined reactive element of the plurality of reactive elements 70 to the second coil L2. Accordingly, the predetermined reactive element is connected to the parasitic radiating element 21 and the auxiliary parasitic radiating element 22.

In the antenna units 108C and 108D, through the reactive element selection, the frequencies of fundamental wave resonance or third harmonic wave resonance of the parasitic radiating element 21 and the auxiliary parasitic radiating element 22 is able to be switched to further broaden the available band width.

Note that, although the antenna unit shown in FIGS. 19A to 19D is able to selectively connect a predetermined reactive element to the IFA, in the antenna unit 101 illustrated in FIG. 1, the switch and the reactive elements may be connected to one of the terminals T1, T2, T3, and T4 of the coupling element 30.

The antenna units according to preferred embodiments of the present invention may be used, for example, in the low band (about 700 MHz to about 960 MHz) and the high band (about 1.71 GHz to about 2.69 GHz) as described above, or may be used in two frequency bands which are different from those frequency bands and one of which is higher than the other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna unit comprising:
    a coupling element that includes a first coil and a second coil coupled to each other by electromagnetic-field coupling;
    a feeding radiating element; and
    a parasitic radiating element; wherein
    the first coil and a feeder circuit are connected to the feeding radiating element in series;
    the parasitic radiating element is connected to the second coil;
    the feeding radiating element is branched into a long portion and a short portion;
    a distance between an open end of the parasitic radiating element and an open end of the short portion is shorter than a distance between the open end of the parasitic radiating element and an open end of the long portion of the feeding radiating element;
    the antenna unit is provided as an antenna for a first frequency band with fundamental wave resonance of the long portion of the feeding radiating element and fundamental wave resonance of the parasitic radiating element; and
    the antenna unit is provided as an antenna for a second frequency band with higher-order resonance of the parasitic radiating element and resonance of the short portion of the feeding radiating element, the second frequency band being higher than the first frequency band.

2. The antenna unit according to claim 1, wherein
    the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are opposite to each other; and
    the fundamental wave resonance of the parasitic radiating element is allocated to a low frequency side in the first frequency band, and the fundamental wave resonance of the feeding radiating element is allocated to a high frequency side in the first frequency band.

3. The antenna unit according to claim 1, wherein
    the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are the same; and
    the fundamental wave resonance of the feeding radiating element is allocated to a low frequency side in the first frequency band, and the fundamental wave resonance of the parasitic radiating element is allocated to a high frequency side in the first frequency band.

4. The antenna unit according to claim 1, wherein
    the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are opposite to each other; and
    the resonance of the short portion of the feeding radiating element is allocated to a low frequency side in the second frequency band, and the higher-order resonance of the parasitic radiating element is allocated to a high frequency side in the second frequency band.

5. The antenna unit according to claim 1, wherein
    the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are the same; and the higher-order resonance of the parasitic radiating element is allocated to a low frequency side in the second frequency band, and the resonance of the short portion of the feeding radiating element is allocated to a high frequency side in the second frequency band.

6. The antenna unit according to claim 1, wherein
the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are opposite to each other;
the fundamental wave resonance of the parasitic radiating element is allocated to a low frequency side in the first frequency band, and the fundamental wave resonance of the feeding radiating element is allocated to a high frequency side in the first frequency band, and
the resonance of the short portion of the feeding radiating element is allocated to a low frequency side in the second frequency band, and the higher-order resonance of the parasitic radiating element is allocated to a high frequency side in the second frequency band.

7. The antenna unit according to claim 1, wherein
the feeding radiating element and the parasitic radiating element are connected to the coupling element, and a direction of a magnetic field that is generated at the first coil when a current flows from the first coil to the feeding radiating element and a direction of a magnetic field that is generated at the second coil when a current flows from the second coil to the parasitic radiating element are the same;
the fundamental wave resonance of the feeding radiating element is allocated to a low frequency side in the first frequency band, and the fundamental wave resonance of the parasitic radiating element is allocated to a high frequency side in the first frequency band; and
the higher-order resonance of the parasitic radiating element is allocated to a low frequency side in the second frequency band, and the resonance of the short portion of the feeding radiating element is allocated to a high frequency side in the second frequency band.

8. The antenna unit according to claim 1, further comprising an auxiliary parasitic radiating element that is connected to a connection portion of the second coil to the parasitic radiating element.

9. The antenna unit according to claim 1, further comprising a capacitor connected in series between the coupling element and the parasitic radiating element.

10. The antenna unit according to claim 1, further comprising a capacitor connected to a ground by shunt connection between the coupling element and the parasitic radiating element.

11. The antenna unit according to claim 1, further comprising an LC resonant circuit connected to the second coil of the coupling element in series.

12. The antenna unit according to claim 1, further comprising an impedance matching circuit connected to the first coil of the coupling element in series.

13. The antenna unit according to claim 1, further comprising an auxiliary feeding radiating element that is connected to the first coil of the coupling element.

14. The antenna unit according to claim 1, further comprising an inductor connected between an end portion of the long portion of the feeding radiating element and a ground.

15. The antenna unit according to claim 1, wherein the long portion of the feeding radiating element is an IFA that has a grounded portion provided between a feeding point and the open end of the feeding radiating element.

16. The antenna unit according to claim 15, wherein
the feeder circuit is connected to the feeding point; and
the first coil is connected between the grounded portion and a ground.

17. An electronic device comprising:
the antenna unit according to claim 1;
the feeder circuit; and
a housing to accommodate the feeder circuit; wherein
a portion or an entirety of the feeding radiating element corresponds to a portion of the housing.

18. The electronic device according to claim 17, further comprising:
a circuit board; wherein
the coupling element is mounted on a circuit board; and
the feeder circuit is provided on the circuit board.

19. The antenna unit according to claim 1, wherein the parasitic radiating element is defined by a conductor pattern provided on a surface of a resin molded structure.

20. The antenna unit according to claim 1, wherein the coupling element is a chip component that includes a plurality of conductor patterns provided on a plurality of insulating substrates.

* * * * *